United States Patent
Bridgers

(10) Patent No.: US 6,869,246 B2
(45) Date of Patent: Mar. 22, 2005

(54) INTERNODAL CONNECTOR ARCHITECTURE SYSTEM

(76) Inventor: Steven B. Bridgers, 3920 Calawassee Rd., Mayo, MD (US) 21106

( * ) Notice: Subject to any disclaimer, the term of this patent is extended or adjusted under 35 U.S.C. 154(b) by 0 days.

(21) Appl. No.: 09/729,743

(22) Filed: Dec. 6, 2000

(65) Prior Publication Data

US 2001/0000717 A1 May 3, 2001

Related U.S. Application Data

(63) Continuation-in-part of application No. 08/903,023, filed on Jul. 30, 1997, now abandoned.
(60) Provisional application No. 60/032,885, filed on Dec. 13, 1996.

(51) Int. Cl.$^7$ .................................................. F16D 1/00
(52) U.S. Cl. .................. 403/229; 403/171; 403/176; 403/217; 403/220; 52/81.3; 52/655.2; 135/122
(58) Field of Search .................... 403/169–171, 403/176, 180–182, 217–220, 229, 293; 521/81.3, 655.1, 655.2; 434/276–281; 135/122–125, 127, 141, 144; 273/155; 446/487; 267/174, 178; 464/92, 97; 901/15, 28–30, 36, 39; 623/63

(56) References Cited

U.S. PATENT DOCUMENTS

| 1,851,159 | A | * | 3/1932 | Dodge ........................ 434/278 |
|---|---|---|---|---|
| 2,212,456 | A | | 8/1940 | Reed |
| 2,684,822 | A | * | 7/1954 | Odin .......................... 403/229 |
| 3,049,897 | A | | 8/1962 | Arpels |
| 3,333,349 | A | | 8/1967 | Brumlik |
| 3,343,864 | A | * | 9/1967 | Baer ....................... 294/119.3 |
| 3,694,954 | A | | 10/1972 | Brumlik |
| 3,830,011 | A | | 8/1974 | Ochrymowich |
| 4,020,566 | A | | 5/1977 | Dreiding |
| 4,080,925 | A | * | 3/1978 | Moore .................... 116/117 R |
| 4,288,947 | A | | 9/1981 | Huang |
| 4,484,430 | A | | 11/1984 | Rossman |
| 4,778,184 | A | | 10/1988 | Fleischer |
| 4,964,062 | A | * | 10/1990 | Ubhayakar et al. ......... 700/249 |
| 5,030,103 | A | | 7/1991 | Buist et al. |
| 5,129,279 | A | * | 7/1992 | Rennex ..................... 74/490.5 |
| 5,433,549 | A | * | 7/1995 | McGaffigan ................ 403/229 |
| 5,542,871 | A | | 8/1996 | Gabriel |
| 5,556,218 | A | | 9/1996 | Homer |
| 5,556,219 | A | | 9/1996 | Mason |
| 5,590,674 | A | * | 1/1997 | Eppenbach ................. 135/114 |
| 5,640,811 | A | * | 6/1997 | Boyle et al. .................... 52/86 |

FOREIGN PATENT DOCUMENTS

JP                6-220815        *   8/1994       ............. E01F/9/01

* cited by examiner

Primary Examiner—Daniel P. Stodola
Assistant Examiner—Michael P. Ferguson
(74) Attorney, Agent, or Firm—Foley & Lardner LLP

(57) ABSTRACT

A universally compliant and restorative internodal connector architecture system wherein a plurality of nodal members are interconnected by a spring and strut assembly in a manner that permits manual or actuated relocation of the nodal spacial definition using standard modules.

49 Claims, 6 Drawing Sheets

INTERNODAL CONNECTOR ARCHITECTURE SYSTEM

RELATED APPLICATIONS

This application is a continuation-in-part application of U.S. Ser. No. 08/903,023 filed on Jul. 30, 1997 now abandoned, in the name of Steven B. Bridgers and entitled "Smart Patch Connector" and claims priority under 35 USC 120 to provisional application No. 60/032,885 filed on Dec. 13, 1996 in the name of Steven B. Bridgers and entitled "Universal Buckminsterfullerene Inter/Intra Connector".

FIELD OF THE INVENTION

The present invention relates to connector assemblies and, in particular, to an internodal connector architecture modality for multinodal planar and surfacial configurations. Moreover, the invention relates to a universal, fully rotating dynamic connector for use in modeling, construction, and other fabrications.

BACKGROUND OF THE INVENTION

Many approaches have been taken for establishing multidimensional architecture for use as models, skeletal framework, building kits and the like. While creating versatile shapes, the resultant shapes are primarily static structures relegated to fixed configurations. Moreover, the internodal architecture was relatively rigidly defined, requiring numerous base connector designs for achieving varying shapes and contours.

For instance, U.S. Pat. No. 5,030,103 to Buist et al. a molecular model assembly having a plurality of articulating arms attached to a core member. Each arm is limited to articulation in a single plane, and subject to such constraints, could be connected to like adjacent components.

U.S. Pat. No. 3,333,349 to Brumlik discloses a molecular orbital model assembly wherein a plurality of preformed spoked coupling elements may be telescopically assembled with tube members for creating polyhedral shapes. Inasmuch as the coupling elements are rigid and preformed, each model requires a multiplicity of coupling elements. Once assembled a rigid, non-kinetic model is provided.

U.S. Pat. No. 4,778,184 to Fleischer discloses a multi-dimensional sculpture puzzle toy wherein a plurality of tubes are joined together with internal cords that serve as hinges and allow the device to form various geometric shapes. The cord is ineffective in transferring force or movement between the tubes.

U.S. Pat. No. 3,694,954 to Brumlik discloses a construction element having mating segments interconnected by a flexible strap. The arrangement allows limited relative movement between the segments but does not have the capability to transfer forces or movements between adjacent components.

U.S. Pat. No. 5,542,871 to Gabriel discloses a construction rod system wherein tie rods are releasably connected with joint elements. The tie rods have limited universal movement with respect to the joint elements for facilitating assembly. Once fixed in a three-dimensional array, a relatively rigid assembly is effected.

U.S. Pat. No. 4,484,430 to Rossman discloses a structural connector having a plurality of radially disposed arms independently rotatably connected to a common hub primarily for establishing planar support platforms.

U.S. Pat. No. 5,556,218 to Homer disclosed a wedge block clamping system for tubular member using a rigid multiple arm connector system.

U.S. Pat. No. 3,049,897 to Arpels discloses a three-link connector system accommodating relative angular movement between links about a common orbital point.

U.S. Pat. No. 4,020,566 to Dreiding discloses a construction set for stereochemical model using rigid arms releasably connected between hub members at releasable bayonet connections. The resulting structures are rigid.

U.S. Pat. No. 2,212,455 to Reed discloses an adjustable pipe railing fitting having a plural radial arm individually rotatably connected to a common hub. The resultant assembly is static and rigid.

U.S. Pat. No. 5,556,219 to Mason discloses a multiple prong connector hub that telescopically receives tubular connecting struts for creating rigid three-dimensional models.

U.S. Pat. No. 3,830,011 to Ochrymovich discloses a model having tubular struts interconnected by multiple pronged hub connector formed from a flexible sheet material. The resultant structures are rigid and fixed in configuration after assembly.

U.S. Pat. No. 4,288,947 to Huang discloses a modular dome structure formed of Y-joints and strut members that is rigidized by inflation after assembly through vulcanization and curing.

Individual assemblies using compression springs between a center body and radially extending arms have been proposed as effective as a single unit shock absorbing parachute deployable wind vane as disclosed in U.S. Pat. No. 4,080,925 to Moore. The indicator is not intended for coupling with other like structures.

Based on the foregoing, it is apparent that the prior art structures have limited ability for constructing structures using a common internodal architectural definition, requiring a plurality of adaptations to form variant structures. Further, the internodal structures are passive connecting systems accommodating limited relative movement and are primarily intended for static environments.

SUMMARY OF THE INVENTION

The present invention provides a universally compliant and restorative internodal connector architecture system wherein a plurality of nodal members are interconnected by a spring and strut assembly in a manner that permits manual or actuated relocation of the nodal spacial definition using standard modules. The system may include a nodal body member having an internal cavity and a plurality of compliant strut members. Each strut member includes a spring member having a passage therethrough operatively attached at one end to the nodal body member for universal compliant movement with respect thereto and communicating with said internal cavity. The spring members at the other end are operatively connected to an elongated hollow link member having an internal passage extending therethrough communicating with the passage in the nodal members. The link members are adapted for interconnection with a similar compliant strut member on another nodal body member with said passages and said cavity providing a continuous circuit therethrough for the deployment of operating systems therewithin.

The connector architecture is based on the dodecaicosohedral symmetry found in the carbon-60 molecule and many other naturally occurring structures. In such form, the connector is particularly suited for the construction of domes, spheres, tubes and other polyhedral structures. Therein the spring members function as flexible, tunable compliant connector modalities. Such compliancy permits the relative structural angles to vary enabling the structures in response to induced or directed movement to assume an equilibrium moved state through internal and/or external actuation. The connector architecture is compatible with conventional and micro-scale manufacture and assembly.

By incorporating the compliant elements, a plurality of accommodating and beneficial functions are attained. In conventional mechanics, torque, differential movement, relative rotation, and triaxial force transmission are provided. The elements may also be employed for electromagnetic and thermal control. Remote control systems may be used for effecting selective movement of the components. The extent and mobility of the resultant structures is a function of the resilience and attenuation of the connected members. The more resilient and finely tuned, the greater the range of movement. In geometrical array, the assembled structures based on the connector architecture may be folded and extended between stowed and deployed form.

DESCRIPTION OF THE DRAWINGS

The above and other features and advantages of the present invention will become apparent upon reading the following detailed description taken in conjunction with the accompanying drawings in which.

DESCRIPTION OF THE PREFERRED EMBODIMENTS

Figure 1:
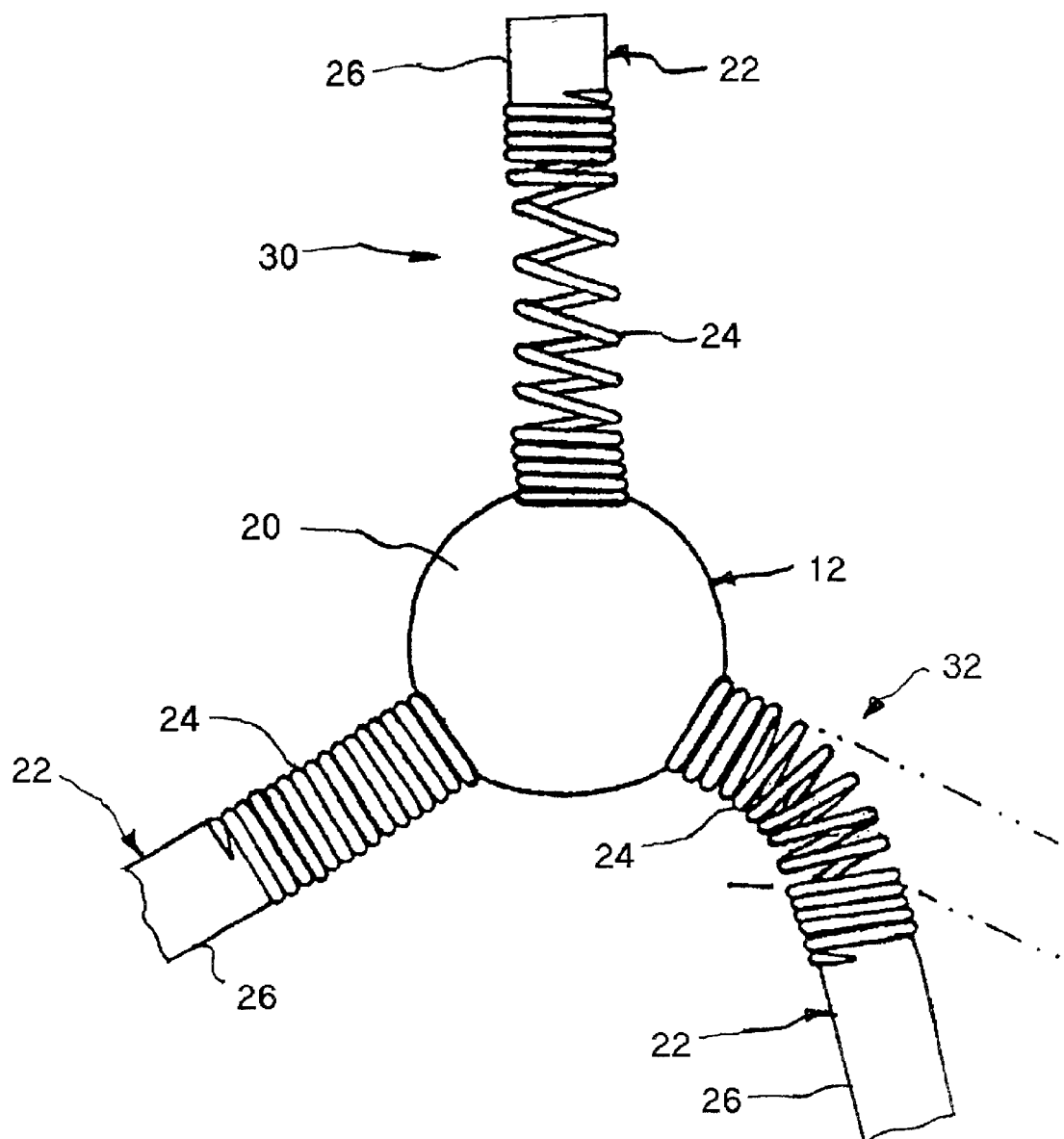
FIG. 1 is a connector module for an internodal connector architecture system in accordance with the invention.

Referring to the drawings for the purposes of illustrating preferred embodiments of the invention and not for limiting same, there is shown an internodal connector architectural system 10 for operatively and flexibly interconnecting a plurality of nodal sites disposed in three dimensional or planar orientation. For purposes of preliminary description, the invention will be referenced to the tetrahedral structure of FIG. 3 and the cubical structure of FIG. 2. However, it will become apparent that the system may be deployed in many configurations, regular or irregular, based on triangulated and non-triangulated spacial definitions. As to such definitions, the system accommodates and initiates selective, controlled and compliant response to externally or internally applied forces and movements to establish a desired reorientation. Controlled actuation and like utility subsystems may be incorporated or pendantly applied.

Referring to FIG. 1, an internodal connector architecture system 10 comprises base connector modules 12 in accordance with the invention to define spatially varying geometries. Each connector module 12 comprises a center node 20 having a plurality of universally compliant and restorative struts 22 connected at angularly spaced locations thereto. The struts 22 include a helically coiled spring 24 connected at an inner end to the node 20 and connected at an outer end to the inner end of an elongated link member 26. The outer ends of the link member 26 are adapted to be connected with an adjacent strut or spring on another module for establishing in assembly with a plurality of like modules a three dimensionally configured frame assembly.

Figures 5, 6, 7:
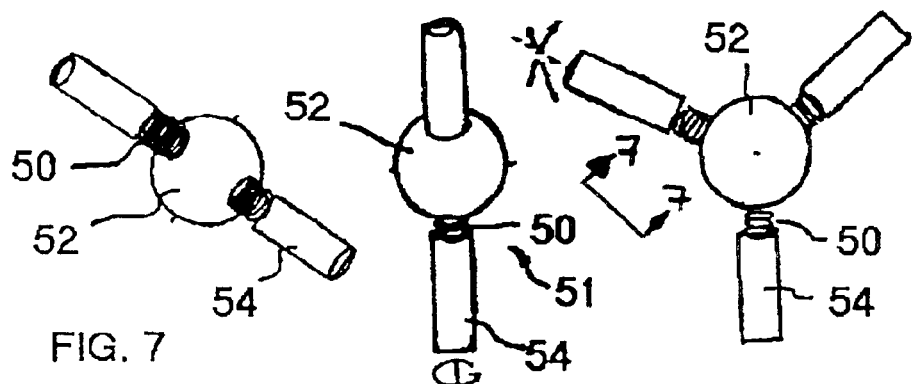
FIG. 5 is a side view of a connector module.
FIG. 6 is a front view of the connector module of FIG. 5.
FIG. 7 is a side view of the connector module taken along line 7—7 of FIG. 6.
Figure 8:
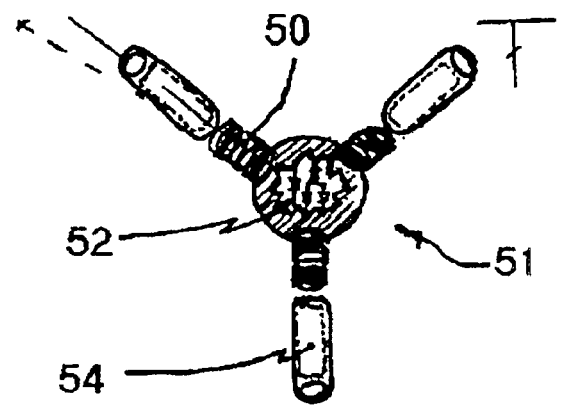
FIG. 8 is an exploded front view of the connector module.
Figure 9:
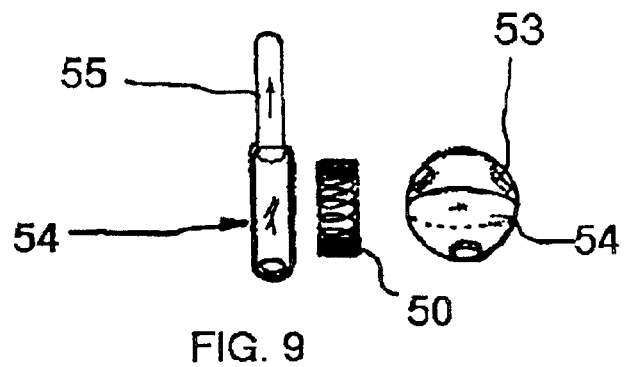
FIG. 9 is a front view of the components of the connector module.

The node 20, as shown additionally in FIGS. 7 through 9, is illustrated as spherical, however it will be apparent that various other configurations may be utilized for providing a common anchoring site for associated struts. Similarly, the spring 24 is illustrated as a helically coiled extension spring, however other universally compliant, coiled and uncoiled, triaxially translatable components may be utilized. As such, the spring 24 affords many compliant capabilities. The spring accommodates axial movement as shown by numeral 30 in FIG. 1. The spring dampens axial movement. The spring transmits torque. The spring dampens torque. The spring accommodates universal movement of the node relative to the strut. Upon displacement, the spring develops restorative forces for self-biasing to the original condition as shown by numeral 32 in FIG. 1. In the described embodiment, the spring 24 is a conventional helically coiled extension type operatively symmetrical with respect to a longitudinal axis. In assembly with the node 20, the axes of the spring may be regularly angularly spaced and coincident. For the illustrated module, three modules are equally circumferentially spaced and lie in a common plane. Such a base configuration may be flexibly deployed as a standard module for establishing a wide variety of spacial definitions. However, a greater or lesser number of springs with varying polar orientations may be employed for discrete definitions, while retaining the benefits of the invention.

The springs may be connected between the nodes and the struts in any suitable manner allowing the spring to maintain the aforementioned functions. As illustrated in FIG. 8, the inner end of the spring 50 of the connector module 51 may be retained in a counterbore 53 in the node 52. The outer end of the spring is connected with telescoping tubes 55 of a strut 54. However, other mechanical, adhesive or otherwise connective means may also be employed for the connections.

The struts function as a spacing member between the respective nodes and springs. As illustrated, the struts are tubular and coaxially connected with the springs. However, the struts may provide for relative translation and articulation, actuated or accommodated, with non-coaxial alignment therebetween or with respect to the springs. As illustrated the struts are tubular having a longitudinal axis coaxial with the springs. Solid and non-cylindrical components may also be used as the connecting structure between the node sites.

Figure 10:
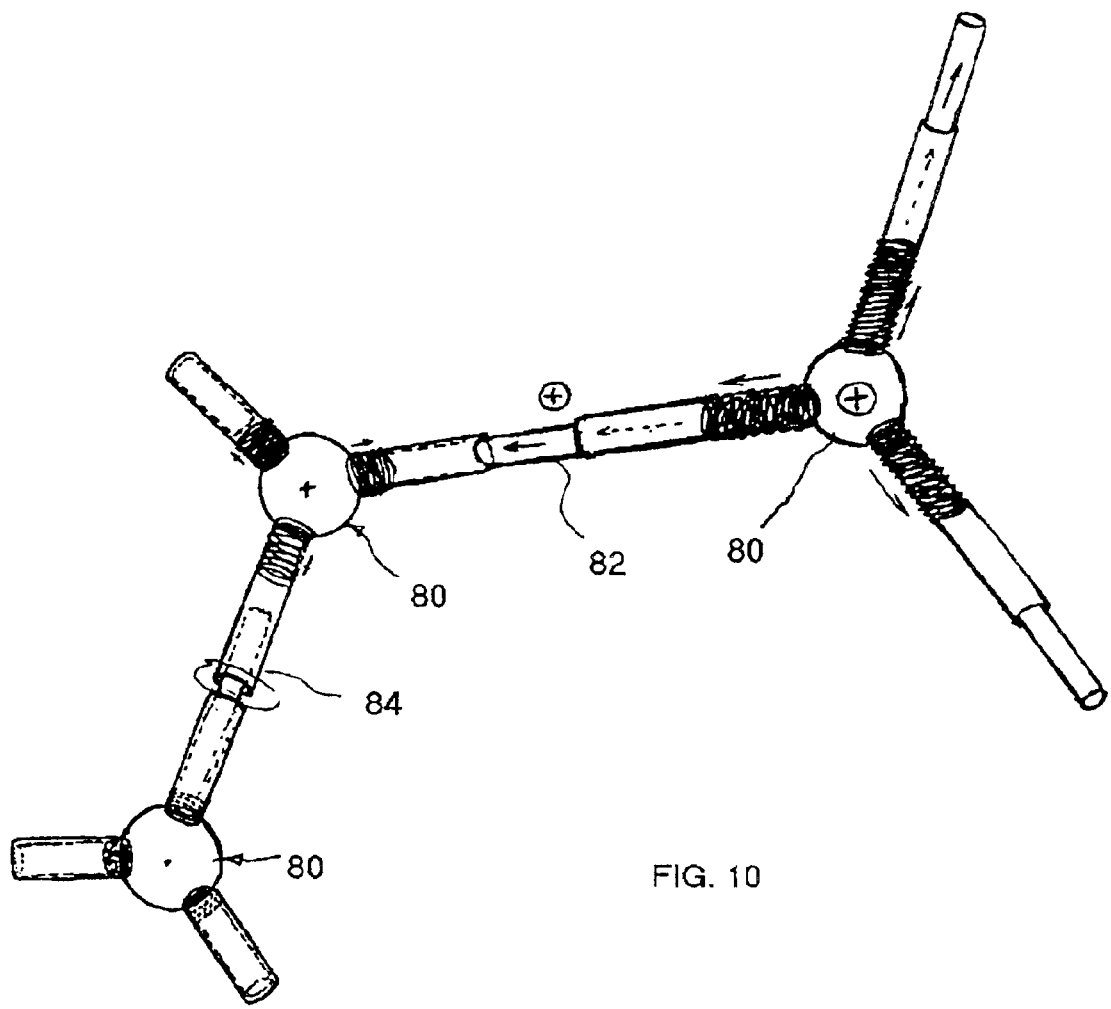
FIG. 10 is a perspective view of a further embodiment of internodal connector architecture system.

In the illustrated cylindrical form or with interior passages defined in the components, various control, actuating and utility functions may be incorporated within the system for ancillary purposes or for effecting movement of the node sites. For instance, as shown in FIG. 10, a rotary or linear actuator 80 may be disposed within telescoping struts 82, 84 and connected at operative ends with either the separate struts or with the nodes. Accordingly, the effective strut length may be extended or contracted to change the spacial definitions of the connected nodes and as accommodated by compliant movement of the other components. Such power supplies may be internally or exteriorly located and routed within the interior passages. Such movement may also be effected by actuators disposed exteriorly. Similarly rotary actuators will effect compliant resultant movement. The internal passages may also be utilized for passive routing such as electrical, hydraulic and other utility functions. Upon disabling of the actuators and the like, the restorative biasing of the compliant springs will return the system to the original equilibrium condition.

Figure 3:
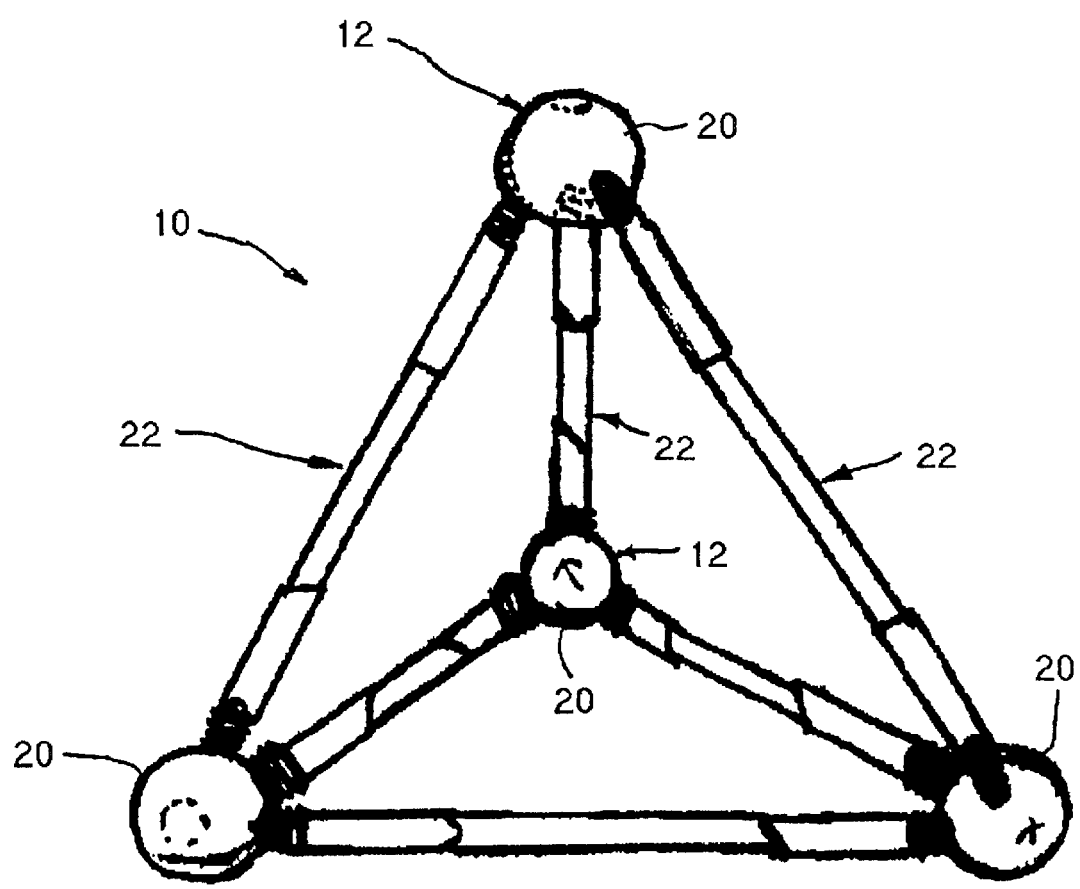
FIG. 3 is a perspective view of a tetrahedron is accordance with another embodiment of the present invention.

The foregoing features and advantages may be illustratively incorporated into the regular tetrahedron shown in FIG. 3. Therein, the nodal site is spherical, the springs of the helical extension type and equally angularly spaced in a common plane, and the struts of equal length and telescopically connected. It will be appreciated that such a configuration represents the greatest stressed condition for a polyhedral shape. Nonetheless, the structure is highly compliant in achieving the fully triangulated orientation. Other polyhedrons obviously impose lesser stressed conditions. Thus, it clearly demonstrates that a standard connector may be utilized in achieving a broad variety of spacial definitions. Nonetheless, dedicated nodes having orientations specific to the design structure may be used.

Each strut may also be manually shifted or actuated to vary the effective length to establish a revised nodal orientation and accordingly an irregular configuration. The compliancy of the structure readily accommodates such revision. Further, upon restoration of the original strut condition, the restorative biasing of the springs reestablishes the original condition.

Figure 2:
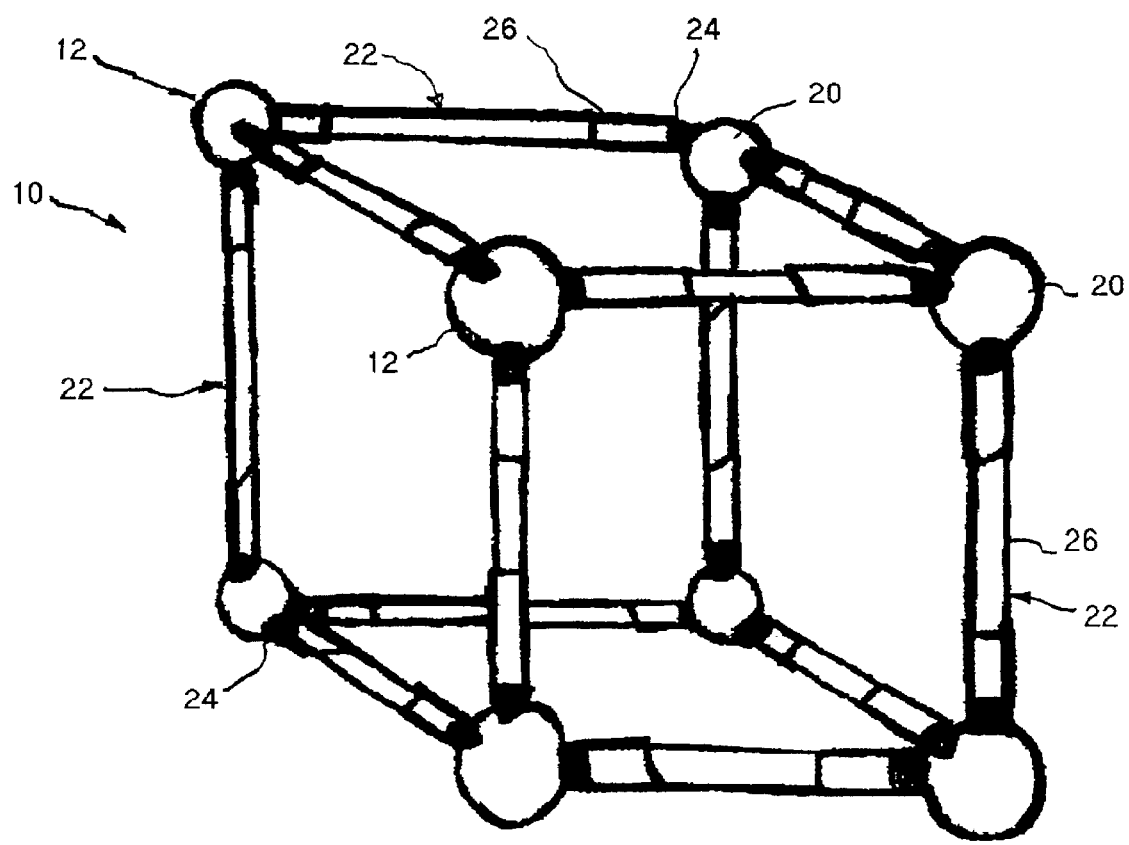
FIG. 2 is a perspective view of a cube in accordance with an embodiment of the present invention.

Referring to FIG. 2, the illustrated cubical frame can also be established by the common components. As a non-triangulated architecture, the frame, in addition to the foregoing actuations, may also be collapsed and redeployed, demonstrating further the flexibility and adaptability of the system. Therein, the upper nodal plane may be moved, through the compliancy of the struts and springs into a common plane with the lower nodal plane. Upon release of the confinement, the restorative characteristic of the system will provide self-biasing to the original condition. The cubical frame may be further compliantly collapsed to align the struts in parallel juxtaposed positions whereby the frame is compacted along a longitudinal axis. Furthermore, the outer components may be inwardly folded for further compaction and storage. Upon release of confinement, the restorative biasing will reestablish the original cubical condition. Such capabilities allow complex configurations to be compactly stowed, transported, and redeployed at alternative sites.

The architecture may also be deployed in substantially planar array as shown in FIG. 10. Therein, a plurality of modules 80 are interconnected with a telescopic struts 82 and a rotary strut 84 as described above, with terminal peripheral components available for termination or connection with like or dissimilar structures. The resultant compliant conformal surface may adapt to varying abutting curvatures or be selectively actuated to achieve revised definition.

Figure 4:
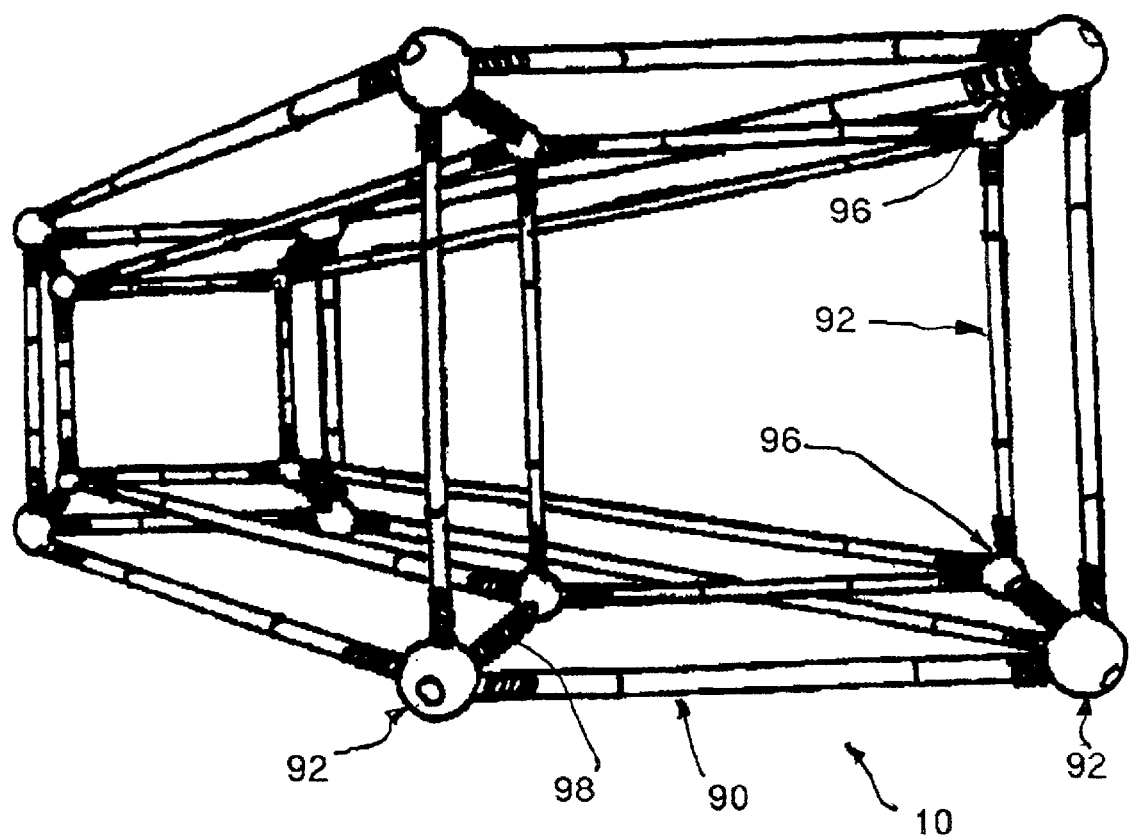
FIG. 4 is a perspective view of internested connector assemblies in accordance with a further embodiment of the invention.

As shown in FIG. 4, plural geometric arrays may be inter-disposed. Thus, an outer body or hexagon 90 spatially defined by connector assemblies 92 may be compliantly connected with an inner body or hexagon 94 based on connector assemblies 96 by interconnecting compliant springs 98. It will be appreciated that discrete, macro movement or deformation of the outer body 90 will limitedly affect the inner body 94 inasmuch as the reaction forces will be attenuated by the compliancy.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims

What is claimed:

1. A connector module comprising:
    a body, at least a portion of said body having a solid exterior surface;
    a resilient member having a first end connected to a location on said solid exterior surface and a second end, said resilient member accommodating rotational and translation motion in more than one plane from said location;
    a strut, said strut having a first end connected to said second end of said resilient member and a second end for connection to another structural element, said strut comprising a telescoping member; and
    an actuator to extend and contract said telescoping member.

2. A connector module as recited in claim 1, comprising an actuator to adjust a position of said resilient member.

3. A connector module comprising:
    a body;
    a resilient member accommodating translational and rotational motion in more than one plane, said resilient member having a first end connected to said body and a second end;
    a strut, said strut having a first end connected to said second end of said resilient member and a second end for connection to another structural element, said body comprising a counter bore, said resilient member being inserted into said counter bore,
    said strut comprising a telescoping member.

4. A connector module as recited in claim 3, comprising an actuator to extend and contract said telescoping member.

5. A connector module as recited in claim 3, comprising an actuator to adjust a position of said resilient member.

6. A connector module comprising:
    a body, at least a portion of said body having a solid exterior surface;
    a resilient member having a first end connected to a location on said solid exterior surface and a second end, said resilient member accommodating rotational and translation motion in more than one plane from said location;
    a strut, said strut having a first end connected to said second end of said resilient member and a second end for connection to another structural element, said strut comprising a telescoping member; and
    an actuator to adjust a position of said resilient member.

7. A connector module comprising:
    a body;
    a resilient member accommodating translational and rotational motion in more than one plane, said resilient member having a first end connected to said body and a second end;
    a strut comprising a telescoping member, said strut having a first end connected to said second end of said resilient member and a second end for connection to another structural element; and
    an actuator to extend and contract said telescoping member.

8. A connector module as recited in claim 7, comprising an actuator to adjust a position of said resilient member.

9. A connector module comprising:
    a body;
    a resilient member accommodating translational and rotational motion in more than one plane, said resilient member having a first end connected to said body and a second end, said resilient member further accommodating axial motion;
    a strut comprising a telescoping member, said strut having a first end connected to said second end of said resilient member and a second end for connection to another structural element; and
    an actuator to extend and contract said telescoping member.

10. A connector module as recited in claim 9 comprising an actuator to adjust a position of said resilient member.

11. A connector module comprising:
   a body;
   a resilient member accommodating translational and rotational motion in more than one plane, said resilient member having a first end connected to said body and a second end, said resilient member further accommodating axial motion;
   a strut, said strut having a first end connected to said second end of said resilient member and a second end for connection to another structural element;
   said body comprising a counter bore, said resilient member being inserted into said counter bore,
   said strut comprising a telescoping member.

12. A connector module as recited in claim 11, comprising an actuator to extend and contract said telescoping member.

13. A connector module as recited in claim 12 comprising an actuator to adjust a position of said resilient member.

14. A connector module as recited in claim 11 comprising an actuator to adjust a position of said resilient member.

15. A connector module comprising:
   a body;
   a resilient member accommodating translational and rotational motion in more than one plane, said resilient member having a first end connected to said body and a second end;
   a strut comprising a telescoping member, said strut having a first end connected to said second end of said resilient member and a second end for connection to another structural element;
   said resilient member further accommodating axial motion and providing a degree of motion permitting said strut to move between a position in a first plane and a position in a second plane; and
   an actuator to extend and contract said telescoping member.

16. A connector module comprising:
   a body;
   a resilient member accommodating translational and rotational motion in more than one plane, said resilient member having a first end connected to said body and a second end, said resilient member further accommodating axial motion;
   a strut comprising a telescoping member, said strut having a first end connected to said second end of said resilient member and a second end for connection to another structural element; and,
   an actuator to adjust a position of said resilient member.

17. A structure comprising a plurality of connector modules, each said connector module comprising;
   a body;
   a resilient member accommodating translational and rotational motion in more than one plane, said resilient member having a first end connected to said body and a second end;
   a strut, said strut having a first end connected to said second end of said resilient member and a second end for connection to another structural element, said strut comprising a telescoping member; and
   an actuator to extend and contract said telescoping member.

18. A structure as recited in claim 17, comprising an actuator to adjust a position of said resilient member.

19. A structure as recited in claim 18, said resilient member accommodating axial motion.

20. A structure as recited in claim 17, said resilient member accommodating axial motion.

21. A structure as recited in claim 17, comprising an actuator to adjust a position of said resilient member.

22. A structure as recited in claim 21, said structure having an adjustable shape defined by connections between said second end of said strut and said another structural element and a position of said resilient member of at least one of said plurality of said connector modules.

23. A structure as recited in claim 21, said structure being collapsible.

24. A structure as recited in claim 21, said strut of at least one of said plurality of connector modules comprising a telescoping member.

25. A structure comprising a plurality of connector modules, each said connector module comprising;
   a body;
   a resilient member accommodating translational and rotational motion in more than one plane, said resilient member having a first end connected to said body and a second end;
   a strut, said strut having a first end connected to said second end of said resilient member and a second end for connection to another structural element said strut comprising a telescoping member; and
   an actuator to adjust a position of said resilient member.

26. A structure as recited in claim 25, said resilient member accommodating axial motion.

27. A structure comprising a plurality of connector modules, each said connector module comprising;
   a body;
   a resilient member accommodating translational and rotational motion in more than one plane, said resilient member having a first end connected to said body and a second end;
   a strut, said strut having a first end connected to said second end of said resilient member and a second end for connection to another structural element, said structure having an adjustable shape defined by connections between said second end of said strut and said another structural element and a position of said resilient member of at least one of said plurality of said connector modules, said structure being collapsible, said strut of at least one of said plurality of connector modules comprising a telescoping member; and
   an actuator to extend and contract said telescoping member.

28. A structure as recited in claim 27, comprising an actuator to adjust a position of said resilient member of at least one of said connector modules.

29. A structure comprising a plurality of connector modules, each said connector module comprising;
   a body;
   a resilient member accommodating translational and rotational motion in more than one plane, said resilient member having a first end connected to said body and a second end, said resilient member accommodating axial motion;
   a strut comprising a telescoping member, said strut having a first end connected to said second end of said resilient member and a second end for connection to another structural element; and
   an actuator to extend and contract said telescoping member.

30. A structure as recited in claim 29, comprising an actuator to adjust a position of said resilient member.

31. A connector module comprising:
   a body, at least a portion of said body having a solid exterior surface;

a resilient member having a first end connected to a location on said solid exterior surface and a second end, said resilient member accommodating axial, translational and rotational motion from said location; and a telescoping strut having a first end connected to said second end of said resilient member and a second end, said second end being connectable to another structural element; and an actuator to extent and contract said telescoping strut.

32. A connector module as recited in claim 31, comprising an actuator to adjust a position of said resilient member.

33. A connector module comprising:

a body;

a resilient member accommodating translational and rotational motion in more than one plane, said resilient member having a first end connected to said body and a second end;

a strut, said strut having a first end connected to said second end of said resilient member and a second end for connection to another structural element, said body comprising a counter bore, said resilient member being inserted into said counter bore, said resilient member providing a degree of motion permitting said strut to move between a position in a first plane and a position in a second plane, said strut comprising a telescoping member.

34. A connector module as recited in claim 33, comprising an actuator to extend and contract said telescoping member.

35. A connector module comprising:

a body;

a resilient member accommodating translational and rotational motion in more than one plane, said resilient member having a first end connected to said body and a second end;

a strut, said strut having a first end connected to said second end of said resilient member and a second end for connection to another structural element, said body comprising a counter bore, said resilient member being inserted into said counter bore, said resilient member further accommodating axial motion, said strut comprising a telescoping member.

36. A connector module as recited in claim 35, comprising an actuator to extend and contract said telescoping member.

37. A connector module comprising:

a body;

a resilient member accommodating translational and rotational motion in more than one plane, said resilient member having a first end connected to said body and a second end;

a strut, said strut having a first end connected to said second end of said resilient member and a second end for connection to another structural element, said body comprising a counter bore, said resilient member being inserted into said counter bore, said resilient member further accommodating axial motion, said resilient member providing a degree of motion permitting said strut to move between a position in a first plane and a position in a second plane, said strut comprising a telescoping member.

38. A connector module as recited in claim 37 comprising an actuator to extend and contract said telescoping member.

39. A structure comprising a plurality of connector modules, each said connector module comprising:

a body;

a resilient member accommodating translational and rotational motion in more than one plane, said resilient member having a first end connected to said body and a second end;

a strut, said strut having a first end connected to said second end of said resilient member and a second end for connection to another structural element, said body comprising a counter bore, said resilient member being inserted into said counter bore, said strut comprising a telescoping member.

40. A structure as recited in claim 39 comprising an actuator to extend and contract said telescoping member.

41. A connector module comprising:

a body;

a resilient member accommodating axial, translational and rotational motion said resilient member having a first end and a second end;

said body comprising a counterbore, said resilient member being inserted into said counterbore;

a telescoping strut having a first end connected to said second end of said resilient member and a second end, said second end being connectable to another structural element.

42. A connector module as recited in claim 41, further comprising an actuator to extend and contract said telescoping strut.

43. A connector module as recited in claim 41, comprising an actuator to adjust a position of said resilient member.

44. A structure comprising a plurality of connector modules, each of said connector modules comprising:

a body;

a resilient member accommodating axial, translational and rotational motion, said body having a first end and a second end;

said body comprising a counterbore, said resilient member being inserted into said counterbore, and a telescoping strut having a first end connected to said second end of said resilient member and a second end, said second end being connectable to another structural element.

45. A structure as recited in claim 44, said structure assuming a plurality of shapes determined by relative positions of said resilient member and said telescoping strut of each of said connector modules.

46. A structure as recited in claim 44, said structure assuming a first shape in two dimensions and a second shape in three dimensions.

47. A structure as recited in claim 44, said structure assuming a first shape in two dimensions and a second shape in three dimensions.

48. A structure as recited in claim 44, said resilient member of each of said connector modules being biased to cause said structure to assume a shape absent an external force.

49. A structure as recited in claim 44, said resilient member of each of said connector modules being biased to cause said structure to assume a shape absent an external force.

* * * * *